United States Patent [19]

Jones, Jr.

[11] Patent Number: 5,009,854
[45] Date of Patent: Apr. 23, 1991

[54] AXIAL REACTOR WITH COAXIAL OIL INJECTION

[75] Inventor: William R. Jones, Jr., Monroe, La.

[73] Assignee: Columbian Chemicals Company, Atlanta, Ga.

[21] Appl. No.: 238,588

[22] Filed: Aug. 31, 1988

[51] Int. Cl.$^5$ .............................................. C09C 1/00
[52] U.S. Cl. ............................ 422/150; 422/156; 422/158; 423/449; 423/455; 423/456
[58] Field of Search ............... 422/150, 151, 156, 158; 423/449, 450, 455, 456; 239/423, 424

[56] References Cited

U.S. PATENT DOCUMENTS

| | | | |
|---|---|---|---|
| 3,642,446 | 2/1972 | Heller et al. | 423/455 |
| 3,755,543 | 8/1973 | Latham | 423/456 X |
| 3,755,544 | 8/1973 | Gunnell | 423/456 |
| 4,391,789 | 7/1983 | Estopinal | 423/450 X |
| 4,486,398 | 12/1984 | Casperson | 423/450 |
| 4,765,964 | 8/1988 | Gravley et al. | 422/156 |

Primary Examiner—Robert J. Warden
Assistant Examiner—Rebekah Griffith
Attorney, Agent, or Firm—Jones, Askew & Lunsford

[57] ABSTRACT

An axial flow carbon black reactor for producing carbon black particles having a relatively narrow particle size distribution. Feedstock oil is introduced into the reactor by a spray nozzle located coaxial with the longitudinal center line of the reactor. The oil spray flows either in the countercurrent or the concurrent direction relative to the flow of hot gas through the reactor and produces an oil spray pattern covering either substantially the entire frontal area of the hot gas flow or substantially less than the frontal area. Countercurrent feedstock flow increases coverage of the gas flow area by the oil spray and narrows the particle size distribution of carbon black produced by the reactor, and concurrent feedstock flow produces the opposite result.

9 Claims, 2 Drawing Sheets

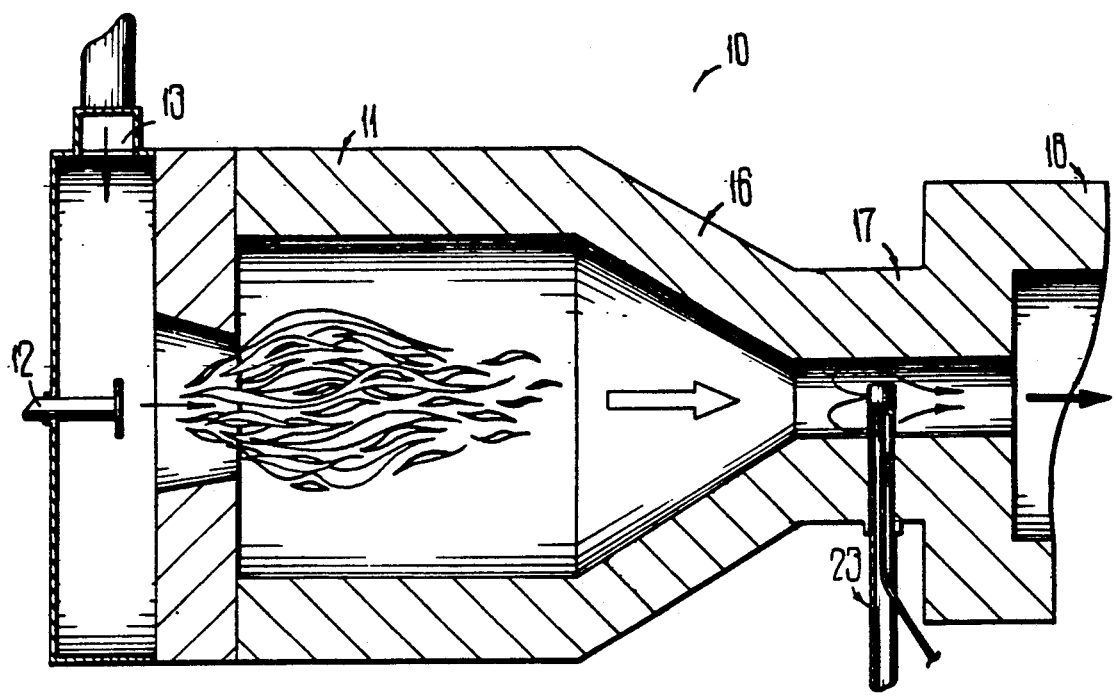
FIG 1
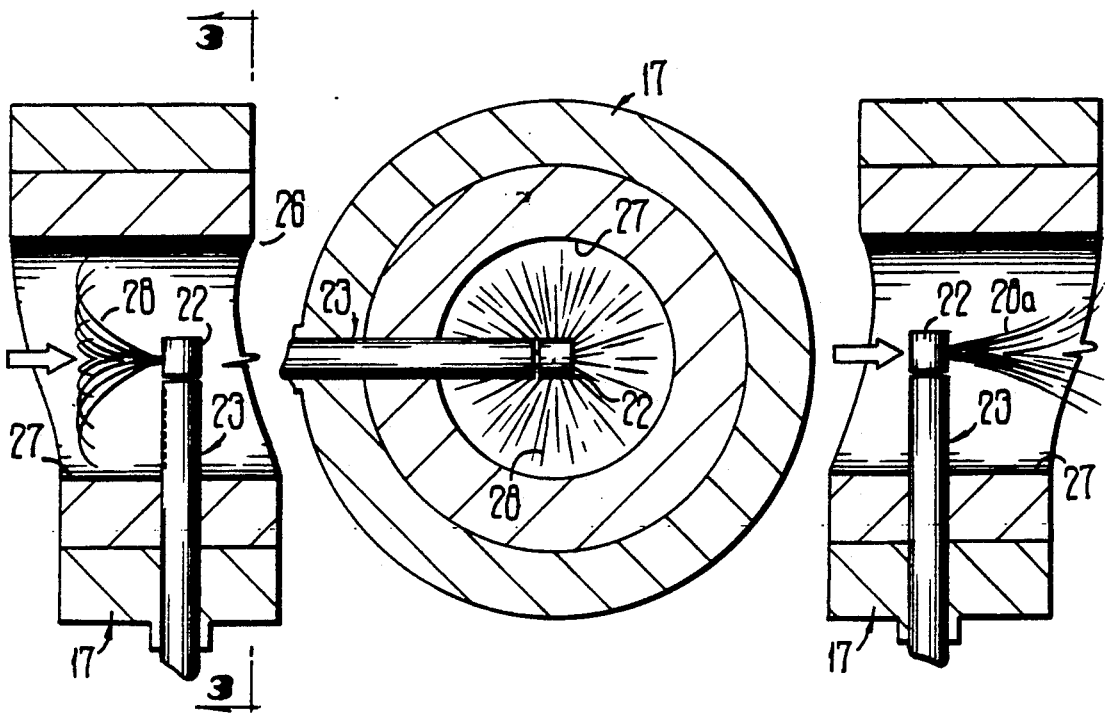
FIG 2   FIG 3   FIG 4

AXIAL REACTOR WITH COAXIAL OIL INJECTION

FIELD OF INVENTION

This invention relates in general to reactors for producing carbon black, and relates in particular to axial flow reactors for controlling the particle size distribution of carbon black produced in the reactor.

BACKGROUND OF THE INVENTION

Carbon black is produced by the pyrolytic decomposition of hydrocarbons, typically in the form of oil introduced into a stream of hot combustion gas. The pyrolytic reaction takes place in a refractory tubular structure known as a reactor.

Commercial production of carbon black generally occurs in either of two different kinds of reactors, the tangential reactor and the axial reactor. The names describe the flow patterns of combustion gas within the reactor. Both kinds of carbon-black reactors are known to those skilled in the art. Generally speaking, the axial-flow reactor is preferred for making carbon black intended for certain uses, particularly those uses where control of particle size distribution of the carbon black product must be maintained within certain relatively narrow ranges. For example, tire companies require carbon blacks with a very narrow particle size distribution for manufacturing racing and high-performance tires, where traction of the tires is a primary requirement. Carbon blacks used for making racing tires thus must have a relatively narrow particle size distribution (also know as "tint", a numerical factor which increases as the particle size distribution decreases).

Carbon blacks having a relatively narrow particle size distribution have heretofore been produced by an axial reactor with one or more flows of feedstock oil radially introduced into the stream of hot combustion gas. This arrangement causes a relatively rapid dispersion of the oil in the gas stream and thus pyrolyzes all the feedstock oil under substantially the same thermal condition, i.e., at substantially the same location within the reactor. Radial introduction has been the normal way of achieving quick mixing of the oil with the hot gas and a resulting short flame within the throat of the reactor, which yields a carbon black with very narrow particle size distribution, i.e., higher tint for the same surface area and structure of the carbon particles. Carbon blacks used in certain other applications should have a lower tint, that is, a wider particle size distribution. Such carbon blacks are produced in reactors designed to increase, rather than minimize, the reaction time of the feedstock, but the use of different reactors for the two kinds of carbon blacks is costly. Nevertheless, there is a need for carbon black with higher tint than commonly available with the conventional radial-injection axial reactor. Moreover, radial injection of the feedstock oil into the conventional reactor of circular cross-section can cause grit and erosion of the reactor inner wall if injection pressure and axial gas velocity are not properly balanced.

SUMMARY OF THE INVENTION

Accordingly, it is an object of the present invention to provide an improved reactor for the production of carbon black.

It is another object of the present invention to provide an improved axial-flow reactor with improved flexibility to increase or decrease the particle size distribution in a controlled manner.

It is yet another object of the present invention to provide an improved axial-flow reactor for producing carbon black with relatively narrow or relatively broad particle size distribution.

It is still another object of the present invention to provide a carbon black reactor capable of obtaining more complete coverage of the cross-sectional area of gas flow through the throat of the reactor.

It is a further object of the present invention to provide an improved method of making carbon black having a relatively narrow or relatively broad particle size distribution.

The foregoing and other objects are met in accordance with the present invention. Stated in relatively general terms, this invention comprises a carbon black reactor in which a hydrocarbon feedstock spray is introduced into a reaction chamber in a direction substantially countercurrent or concurrent to the flow of hot gas through the reaction chamber. The countercurrent flow of the hydrocarbon feedstock oil inceases the dispersion speed of the hydrocarbon spray in the gas flow, thereby narrowing the particle size distribution of the resulting carbon black particles produced by the reactor. The concurrent flow of feedstock hydrocarbon decreases the dispersion speed, thereby enlarging the reaction time of the feedstock and increasing the particle size distribution.

Stated somewhat more specifically, a carbon black reactor according to the present invention includes a spray nozzle spaced radially inwardly from the inner wall of the reaction chamber. The spray nozzle directs a spray of oil along a path generally coaxial with the longitudinal axis of the reaction chamber. This oil spray is directed either in the counterflow direction, that is, upstream into the face of the oncoming flow of hot gas through the reaction chamber, or in the opposite concurrent or downstream direction, and this spray of oil is preferably symmetrical with respect to the longitudinal axis. The countercurrent spray thus covers substantially the entire frontal area of the hot gas flow through the reaction chamber, and thereby increases the frontal cross-section area of the gas flow covered by the oil spray. The reaction time of the feedstock thus is reduced, increasing the tint of the resulting carbon black. The concurrent-flow oil spray, in contrast with countercurrent flow, generally covers substantially less than the entire frontal area of the hot gas flow and increases the reaction time of the feedstock. Reactors according to the present invention thus can have a circular cross-sectional area complementary to the spray of oil within the reaction chamber, without the disadvantages associated with radial injection of oil into circular-section reactors.

The nature of the present invention, as well as other objects and advantages thereof, will become more readily apparent from the following description of a preferred embodiment.

BRIEF DESCRIPTION OF THE DRAWINGS

FIG. 1 is a schematic plan of an axial flow reactor according to a preferred embodiment of the present invention.

FIG. 2 is an enlarged cross-section view showing the reaction chamber of the reactor in FIG. 1.

FIG. 3 is a section view taken along line 3—3 of FIG. 2.

FIG. 4 is a view as in FIG. 2, showing a concurrent-flow embodiment of the present invention.

DETAILED DESCRIPTION OF THE PREFERRED EMBODIMENT

Figure 5:
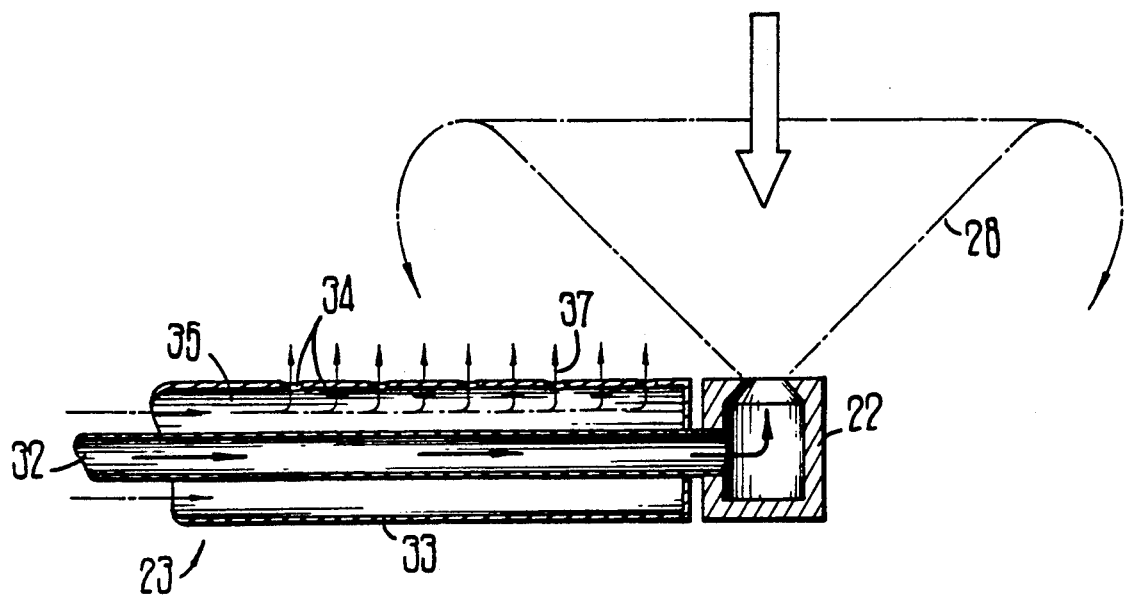
FIG. 5 is a section view of an air-jacketed oil feed tube for the preferred embodiment of the present invention.

Turning first to FIG. 1, an axial-flow carbon black reactor is shown generally at 10. The reactor 10 includes a combustion chamber 11 which receives a suitable source of combustion fuel at the fuel inlet 12, and a source of air at the inlet 13 to support combustion within the combustion chamber. The resulting hot gases formed by fuel combustion within the combustion chamber 11 pass through the converging region 16 leading to the reaction chamber having a cylindrical throat 17. The outlet end of the throat 17 connects to the reaction chamber 18 of generally increased diameter relative to the throat, wherein pyrolytic decomposition of the feedstock oil takes place to produce the carbon black product.

A supply of feedstock oil is introduced to the reactor throat 17 by the spray nozzle 22 located within the throat. The spray nozzle 22 is located substantially coaxial with the longitudinal center line or axis of the throat 17 and of the entire reactor 10. The spray nozzle 22 is connected to an oil feed pipe 23 which in turn receives feedstock oil from a suitable source, not shown herein, as known to those skilled in the art. The spray nozzle 22 is aligned to direct an oil spray in the counter-flow direction within the throat 17, that is, in a direction upstream confronting the hot gas flowing into the throat from the converging region 16 of the reactor.

The throat 17 of the reactor 10 is shown in FIG. 3 with greater detail. The throat 17 comprises a pair of concentric refractory linings 26, preferably having an inner wall 27 generally circular in cross-section as shown in FIG. 3. The spray nozzle 22 is mounted substantially coaxial with the longitudinal center of the throat 17, placing the spray nozzle equidistantly spaced from the interior wall 27 around the entire circumference of that wall.

In the operation of the reactor 10, hot gas from the combustion chamber 10 flows in a generally axial direction into the throat 17 as known to those skilled in the art. Feedstock oil is pumped through the feed tube 23 and exits the nozzle 22 in a counterflow direction to the hot gas, producing an oil spray pattern 28 symmetrical along the longitudinal axis of the throat 17. This spray pattern 28 thus covers substantially the entire cross-sectional area of the hot gas flow through the throat, and thereby increases quick mixing of the oil spray with the flow of hot gas. This quick mixing gives a resulting short flame which yields carbon particles with very narrow particle size distribution, that is, with a higher tint, for the same surface activity and structure of the carbon particles. The symmetrical spray pattern can be adjusted to minimize or avoid contacting the interior wall 27 at all locations around the circumference of the throat, thereby reducing or avoiding reactor grit normally caused by the thermal shock of the feedstock spray contacting the relatively hot interior wall.

A pilot axial reactor with an axial countercurrent oil spray according to the present invention was constructed and operated. The results of that pilot reactor are shown in the following table, where the "Normal" column denotes normal operation of a conventional axial flow reactor having radial oil sprays mounted flush to the refractory interior wall and directing oil sprays radially inwardly from the interior wall toward the axis of the reactor. The right-hand column shows data from the operation of the pilot reactor constructed according to the present invention.

|  |  | Radial Normal | Right Angle Countercurrent Oil Spray |
| --- | --- | --- | --- |
| Air | SCFH | 230000 | 230000 |
| Gas (Blast) | SCFH | 12778 | 12778 |
| Oil | PPH | 2340 | 2340 |
| Air Temp. | °F. | 1008 | 1008 |
| COS | in | 60" u | 60" u |
| Oil Sprays | # | 2 (flush) | 1 centerline countercurrent |
| Oil Location | in | 8" from choke outlet | 4" from choke outlet |
| Oil Pressure | (psig) | 170 |  |

|  | (Pellet Sample) C-21475 Pallet 1 | (Loose Sample) C-21519/1300 Dense Tk Sample |
| --- | --- | --- |
| $I_2$ | 181 | 195 |
| DBP Absorption | 130 | 129 |
| CTAB | 152 | 153 |
| 24M4 | 100 | — |
| NSA | 172 | 182 |
| Tint | 126 | 131 |
| EMSA | 148.8 | 141.1 |
| HI (Particle) | 1.92 | 1.87 |
| HI (Aggregate) | 1.91 | 1.70 |

The results of this test show that tint, a measure of particle size distribution, increased about five units. This reflects a narrowing of particle size distribution by calculating a tint residual, in a manner known to those skilled in the art. Tint residual for the normal reactor is 0, and for the test reactor is +4; the higher the number, the narrower the particle size distribution.

The values of CTAB (a measure of particle size) and particle structure (indicated by DBP absorption) remained essentially constant.

The carbon black particles produced with both reactors were measured by an electron microscope. Although the particles produced by the normal reactor had a higher surface area, particles produced by the test reactor had the narrower particle size distribution as indicated by the heterogenity index (HI). The closer the heterogenity index is to 1, the narrower the distribution.

Figure 6:
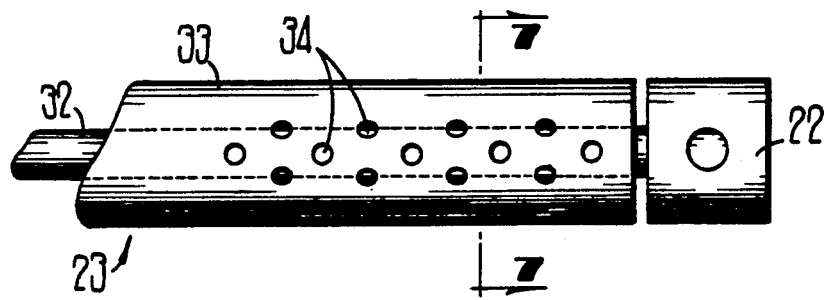
FIG. 6 is a frontal view, partially broken away for illustration, of the oil feed pipe in FIG. 5.
Figure 7:
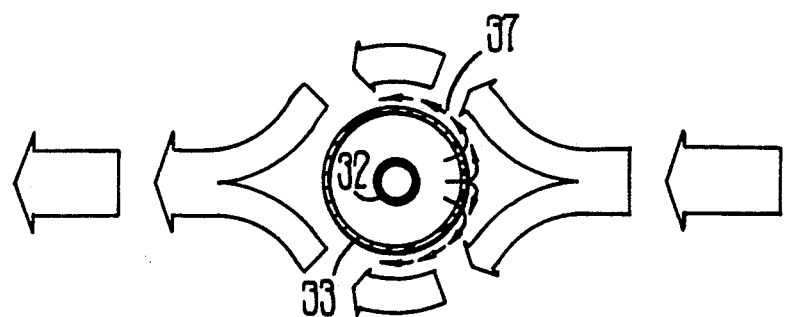
FIG. 7 is a section view taken along line 7—7 of FIG. 6, schematically illustrating the operation of the air-jacketed tube.

The oil feed pipe 23 may require special provisions to prevent oil deposition on that pipe. This is accomplished as shown in FIGS. 5–7 by using an air-jacketed tube with a series of small holes in line with the oil spray to form a curtain of air around the tube. The air curtain deflects oil droplets around the oil pipe, preventing oil deposition which might otherwise cause coking with the reactor. The oil feed pipe 23 comprises an oil supply pipe 32 concentrically disposed inside an air pipe 33. The oil pipe 32 receives a suitable supply of feedstock oil as described above, and supplies that oil to the spray nozzle 22. The outer air pipe 33 is connected to a suitable supply of air under pressure. A number of outlet holes 34 are formed in the side 35 of the air pipe 33 confronting the hot gas flow moving through the reactor throat 17. The air entering the air pipe 33, which is closed at the end adjacent the spray nozzle 22, exits through the outlet holes 34. This exiting air is confronted by the oncoming flow of hot gas in the reactor throat, and the air is deflected back around the outside of the air pipe to form an air curtain 37 flowing around the air pipe, in the vicinity of the oil spray 28 from the nozzle 22. This air curtain 37 deflects oil droplets around the oil pipe 23, preventing impingement of oil on the pipe and thus reducing or eliminating oil deposition which might otherwise cause coking within the reactor. The outlet holes 34 in the air pipe 35 are shown in FIG. 6 as small circular openings, but screened outlets or elongated slots are other possible configurations for those outlet openings.

FIG. 4 shows the present embodiment modified for feedstock flow in the direction concurrent with the direction of hot gas flowing through the throat 17 of the reaction chamber. The spray nozzle, here designated 22a, is rotated 180° within the throat 17 and produces an oil spray 28a directed downstream in the throat and coaxial with the longitudinal axis of the throat. The effect of the concurrent gas stream in the throat lessens the dispersion of the oil spray 28a, and that oil spray thus covers substantially less than the entire frontal area of the gas stream. As a result, the feedstock oil mixes with the gas flow and undergoes reaction more slowly than in the countercurrent-flow embodiment shown in FIGS. 1-3, thereby producing carbon black particles having a relatively higher particle size distribution. The embodiments of FIGS. 1-3 and FIG. 4 structurally differ only in the direction of the feedstock spray nozzle 22/22a, and that direction is readily changeable within a single reactor.

It should be understood that the foregoing relates only to preferred embodiments of the invention, and that numerous modifications and changes may be made therein without departing from the spirit and scope of the invention as defined in the following claims.

I claim:
1. Apparatus for producing carbon black, comprising:
a source of hot gas;
a reaction chamber having an inlet receiving a flow of the hot gas and having an outlet opening through which the hot gas flows to leave the reaction chamber; and
means for introducing a hydrocarbon spray into the reaction chamber in a direction substantially parallel and countercurrent to the flow of hot gas, thereby increasing the dispersion speed of the hydrocarbon spray in the gas flow and narrowing the particle size distribution of the resulting carbon black particles produced.

2. Apparatus as in claim 1, wherein:
the reaction chamber has a longitudinal axis; and
the spray introducing means produces a symmetrical spray pattern coaxial with the longitudinal axis of the reaction chamber, whereby the spray covers substantially the entire cross sectional area of the hot gas flowing through the reaction chamber.

3. Apparatus as in claim 1, wherein:
the reaction chamber is defined by an internal wall;
the means for introducing a hydrocarbon spray comprises a spray nozzle spaced radially inward a substantial distance from the surface of the reaction chamber; and further comprising:
a pipe receiving a supply of oil and extending inwardly through the internal wall for connection to the spray nozzle.

4. Apparatus for producing carbon black, comprising:
a combustion chamber operative to produce a flow of hot gas;
a reaction chamber having an inlet receiving the flow of hot gas and having an outlet opening so that the hot gas flows through the reaction chamber;
a pipe extending radially into the reaction chamber for receiving a supply of feedstock hydrocarbon; and
feedstock hydrocarbon introduction means connected to the pipe within the reaction chamber and operative to introduce the feedstock hydrocarbon into the reaction chamber in an axial direction substantially parallel to the flow of hot gas, so to control the particle size distribution of carbon black particles thereby produced.

5. Apparatus as in claim 4, wherein:
the feedstock hydrocarbon introduction means introduces the feedstock hydrocarbon in a direction substantially countercurrent to the flow of hot gas through the reaction chamber, so that the introduced feedstock covers substantially the entire frontal area of the hot gas flow and thereby increases the dispersion speed of the hydrocarbons in the gas flow and narrows the particle size distribution of the resulting carbon black.

6. Apparatus as in claim 4, wherein:
the reaction chamber has a longitudinal axis and is defined by an internal wall;
the pipe extends radially through the internal wall from outside the reactor; and
the means for introducing feedstock hydrocarbon comprises a spray nozzle connected to the pipe and located coaxially with the longitudinal axis of the reaction chamber.

7. Apparatus for producing carbon black, comprising:
a source of hot gas;
a reaction chamber having an inlet receiving a flow of the hot gas and having an outlet opening through which the hot gas flows to leave the reaction chamber, the reaction chamber having a longitudinal axis and defined by an internal wall having a circular cross section so that the hot gas flowing therethrough has substantially a circular cross-sectional area;
a pipe extending inwardly through the internal wall for receiving a supply of feedstock hydrocarbon; and
a spray nozzle connected to the pipe and spaced radially inward a substantial distance from the surface of the reaction chamber for introducing a feedstock hydrocarbon spray having a symmetrical spray pattern into the reaction chamber in a direction substantially parallel and countercurrent to the flow of hot gas and along a path coaxial with the longitudinal axis of the reaction chamber, so that the feedstock hydrocarbon covers substantially the entire cross-sectional area of the hot gas flow through the reaction chamber and thereby increases coverage of the gas flow area by the feedstock hydrocarbon spray, increases the dispersion speed of the feedstock hydrocarbon spray in the hot gas flow, and narrows the particle size distribution of the resulting carbon black particles produced.

8. Apparatus for producing carbon black, comprising:
a source of hot gas;
a reaction chamber defined by an internal wall, having an inlet receiving a flow of the hot gas, and having an outlet opening through which the hot gas flows to leave the reaction chamber;
a pipe extending inwardly through the internal wall for receiving a supply of feedstock hydrocarbon;
a spray nozzle connected to the pipe and spaced radially inward a substantial distance from the surface of the reaction chamber for introducing a feedstock hydrocarbon spray into the reaction chamber in a direction substantially parallel and countercurrent to the flow of hot gas, thereby increasing the dispersion speed of the feedstock hydrocarbon spray in the gas flow and narrowing the particle size distribution of the resulting carbon black particles produced; and
means associated with the pipe for providing a jacket of air around the pipe so as to prevent oil deposition on the pipe.

9. Apparatus for producing carbon black comprising:
a combustion chamber operative to produce a flow of hot gas;
a reaction chamber having an inlet receiving the flow of hot gas and having an outlet opening so that the hot gas flows through the reaction chamber;
a pipe extending radially into the reaction chamber for receiving a supply of feedstock hydrocarbon; and
means connected to the pipe within the reaction chamber for introducing feedstock hydrocarbon into the reaction chamber in an axial direction substantially parallel and concurrent to the flow of hot gas through the reaction chamber, so that the introduced feedstock hydrocarbon covers substantially less than the entire frontal area of the hot gas flow and thereby reduces the dispersion speed of the feedstock hydrocarbon spray in the gas flow and increases the particle size distribution of the resulting carbon black.

* * * * *